June 12, 1934.                A. KREUZER                1,962,448
         DEVICE FOR ADJUSTING THE THROTTLE VALVE IN THE AIR
             SUCTION PIPE OF COMBUSTION POWER MACHINES
                         Filed Dec. 17, 1930
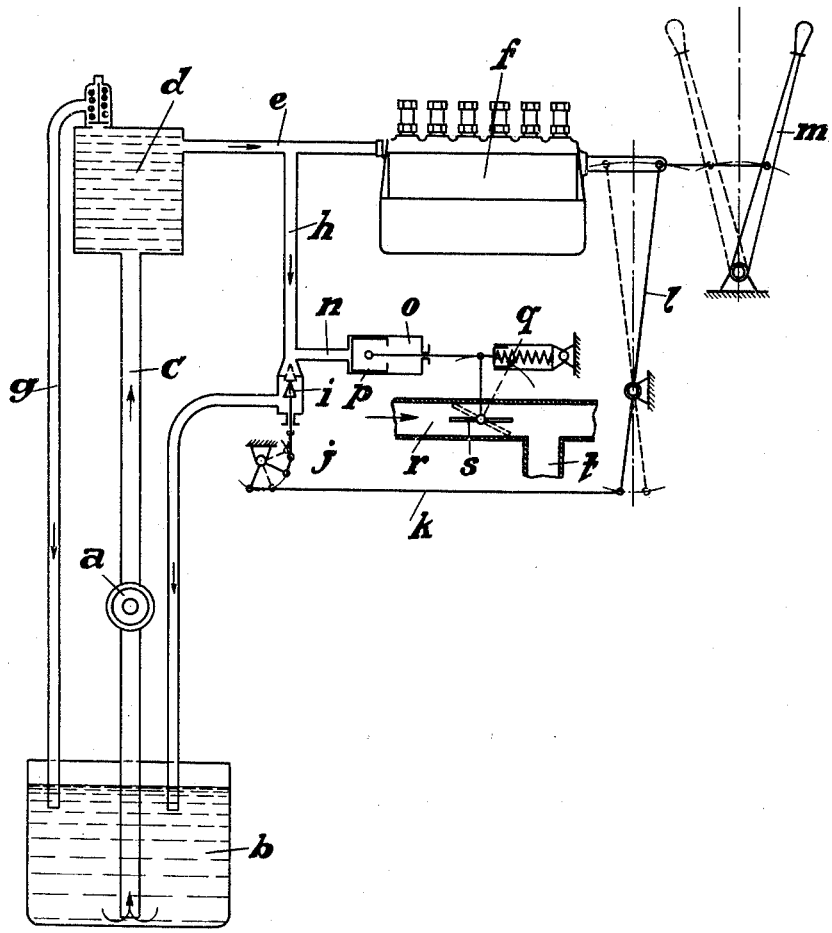
Inventor
Alois Kreuzer
by Maréchal & Noë
    attorneys Patented June 12, 1934

1,962,448

UNITED STATES PATENT OFFICE 1,962,448

DEVICE FOR ADJUSTING THE THROTTLE VALVE IN THE AIR SUCTION PIPE OF COMBUSTION POWER MACHINES

Alois Kreuzer, Augsburg, Germany, assignor to Maschinenfabrik Augsburg-Nurnberg A. G., Augsburg, Germany, a corporation of Germany Application December 17, 1930, Serial No. 502,954
In Germany January 10, 1930

9 Claims. (Cl. 123—139)

This invention relates to internal combustion engines, and more particularly to engines in which the combustion air is preheated at idling speeds.

One object of the invention is the provision of an internal combustion engine having a fluid pressure system for automatically controlling the temperature of the air supplied to the engine in accordance with changes in pressure in the system.

Another object of the invention is the provision, in an internal combustion engine of the character mentioned, of a fluid pressure system having a control means for controlling the fuel supply to the engine the control means being connected to a pressure modifying device so that warm air will be supplied to the engine when the control means is set for idling.

Other objects and advantages of the invention will be apparent from the following description, the appended claims and the accompanying drawing.

The drawing shows a fluid pressure system for Diesel engines, embodying the present invention.

Referring more particularly to the drawing by reference letters, $a$ designates a fluid pump which is driven by means of a belt or gears from the internal combustion engine which is supplied with combustion air by the suction pipe $r$ having a branch pipe $t$ through which warm air may be supplied. The warm air supplied through the branch pipe $t$ may be heated by passing over the hot exhaust pipe of the engine.

The fluid pump $a$, which may be of the plunger type, draws fluid from a reservoir $b$ and delivers it through the pipe $c$ to a pressure chamber $d$. In accordance with the construction herein shown, the fluid in the fluid pressure system is the engine fuel, the pressure chamber $d$ being connected by a suction pipe $e$ to the fuel pump $f$ which supplies fuel to the engine. An excess pressure pipe $g$ connects the fluid reservoir $b$ to the pressure chamber $d$. A branch pipe $h$ extends from the suction pipe $e$ back to the reservoir $b$ and forms a control by-pass for the fuel. In the branch pipe $h$ is a valve $i$ so provided that it may restrict the flow of fuel through this pipe, the valve $i$ being connected to the control lever $m$ by lever $j$ and links $k$ and $l$. The control lever $m$ may be adjusted to control the amount of fuel supplied to the engine from the fuel pump $f$.

Just above the valve $i$ is a pipe $n$ in communication with the branch pipe $h$. This pipe $n$ leads to a control element shown as a cylinder $o$ having a piston $p$ operating therein, the piston being under the control of a spring $q$ which acts against the pressure of the fluid in the pipe $h$. The piston $p$ is connected to the throttle valve $s$ which is provided in the fresh air intake pipe $r$ through which cool air is supplied to the engine cylinders. When the throttle $s$ closes the pipe $r$, as it does under idling conditions, warm air is supplied through the branch pipe $t$, but when the throttle $s$ is open, under substantial loads most of the air supplied comes through the pipe $r$ which connects directly to the outside air and which extends directly in line with the air supply pipe of the motor so as to offer little frictional resistance to air flow.

The operation of the fuel system is as follows: At full load, the control lever $m$ will be in the position shown in full lines. The control valve $i$ which modifies the pressures in the branch pipe $h$ is in its lowered position where it offers little restriction to the flow of fluid from the pressure chamber $d$ back to the reservoir $b$. The throttle valve is therefore held open by the spring $q$. If the lever $m$ is moved to the idling position shown in dotted lines, this controls the fuel pump $f$ so that the proper amount of the fuel is supplied to the engine, and also moves the valve $i$ to restrict the flow of fluid through the pipe $h$. As the pump $a$ is driven at engine speeds, the pressure in the branch pipe $h$ which is in communication with the outlet side of the pump increases, this increased pressure forcing the piston $p$ towards the right against the action of the spring $q$, thus moving the throttle valve to the dotted line position which shuts off the supply of cool air so that the warm air must be drawn into the engine through the branch air pipe $t$. It will thus be apparent that the temperature of the air supplied to the engine is automatically controlled in accordance with the fluid pressure of the fuel supply and the maximum efficiency is obtained at idling conditions. The warm air supplied at idling conditions provides for better combustion of the comparatively small amount of fuel used under light loads, and maintains the temperature in the combustion chambers at a sufficiently high temperature to provide for efficient operation. The throttling of the cool air supply under light loads is accomplished automatically, the throttle being controlled in accordance with the engine speeds so that warmer air is supplied when the engine is operating under idling loads. Sticking of the throttle and its operating mechanism, or chattering of the throttle valve does not affect the control of the fuel to the engine and does not cause irregular operation of the motor as the regulation of the throttle is not dependent upon the regulation of the fuel pump which supplies the engine with fuel, but is dependent upon the fluid pressure of the system supplying fuel to the fuel pump.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an engine of the character described having a means for controlling the temperature of the air supply to the engine, an engine driven fuel pump creating different pressures at different engine speeds, a fuel pipe in communication therewith and subjected to various pressures dependent upon the engine speed, and means responsive to the fuel pressures in said pipe for automatically controlling said first means for increasing the temperature of the air supplied to the engine as the engine load decreases.

2. In an engine of the character described having provisions for supplying warm air and cool air to the engine and having a throttle valve for controlling the temperature of the air supplied to the engine, a fuel pump for supplying fuel to the engine cylinders, an engine driven fluid pump for supplying fuel to said fuel pump and having provision whereby the fluid pressure of the fuel supply varies with changes in engine speed, and means automatically operable in accordance with the changes in pressure of the fuel supply for automatically controlling said throttle valve for the supply of air at a higher temperature to the engine at high no-load engine speeds.

3. In a Diesel engine having warm and cool air supply passages and valve means for controlling the temperature of the air supplied to the engine, a fluid pressure system including an engine driven fluid pump, a control element subjected to various pressures of the outlet side of said pump, means connecting said element to said valve means, control means operable to control the fuel supplied to the engine, and means operated by said control means for modifying the pressure on said element so that cool air is supplied to the engine when said control means is positioned for substantial fuel supply.

4. In a Diesel engine having warm and cool air supply passages and valve means for controlling the temperature of the air supplied to the engine, a fuel supply system comprising an engine driven fuel pump, means for supplying fuel to said pump at pressures which vary with the engine speed, a control piston operable in accordance with variations in the pressure of the fuel supplied to said pump, and a connection between said piston and said valve means for increasing the temperature of the air supplied to the engine under no load high speed condition.

5. In a Diesel engine having warm and cool air supply passages and valve means for controlling the temperature of the air supplied to the engine, a fuel pump for supplying fuel to the engine, control means for said pump, a fluid pressure system for supplying fuel to said fuel pump and comprising a pressure pipe, a valve in said pressure pipe operably connected to said control means for controlling the pressures in said pipe, and an element operable in accordance with the pressure in said pipe for automatically controlling said valve means to increase the temperature of the air supplied to the engine while idling and decreasing the temperature of the air supplied to the engine at substantial engine loads.

6. In a Diesel engine having a cool air passage and a warm air passage, and valve means for controlling the supply of air through one of said passages for the control of the temperature of the air supplied to the engine, a fluid pressure system including an engine driven fluid pump which provides for pressure variations in the fluid pressure system as the engine speed varies, and means responsive to variations of the fluid pressure for automatically controlling said valve means to increase the temperature of the air supplied to the engine at high engine speeds.

7. In a Diesel engine having provision for supplying warm air and cool air to the engine, a fluid pressure system including an engine driven pump arranged to generate varying pressures at varying engine speeds, and means responsive to the pressure of the fluid pressure system for automatically throttling the cool air supply so that the temperature of the air supplied to the engine at high idling speeds will be increased.

8. In a Diesel engine having a control device affecting the supply of fluid to the engine cylinders, a control means for said device comprising a pump driven by said engine and having a fluid connection between its inlet and outlet sides, a controllable throttle valve in said connection for throttling the flow therethrough and creating various pressures on the outlet side of said pump, a fuel injection pump having its inlet in communication with said connection at a point between said throttle valve and the outlet of said engine driven pump, and a pressure responsive member movable in accordance with pressure variations in said connection for automatically moving said engine control device.

9. In a Diesel engine having a control device affecting the supply of fluid to the engine cylinders, a control means for said device comprising a pump driven by said engine and having a fluid connection between its inlet and outlet sides, a controllable throttle valve in said connection for throttling the flow therethrough and creating various pressures on the outlet side of said pump, a fuel injection pump for the engine, a pipe for supplying fuel to said fuel injection pump in communication with the outlet side of the engine driven pump, a manually controlled member, connections from said member to said throttle valve and to said fuel injection pump, and a pressure responsive member movable in accordance with pressure variations on the outlet side of the engine driven pump for automatically moving said engine control device.

ALOIS KREUZER.